(12) United States Patent
Kaufman et al.

(10) Patent No.: US 11,008,093 B2
(45) Date of Patent: May 18, 2021

(54) SYSTEMS AND METHODS FOR REDUCING THE PROPELLER NOISE

(71) Applicant: Aurora Flight Sciences Corporation, Manassas, VA (US)

(72) Inventors: Amanda Kaufman, Manassas, VA (US); Riley C. Griffin, Manassas, VA (US); Kevin Uleck, Manassas, VA (US); Martin Kearney-Fischer, Manassas, VA (US); James D. Paduano, Boston, MA (US)

(73) Assignee: Aurora Flight Sciences Corporation, Manassas, VA (US)

( * ) Notice: Subject to any disclaimer, the term of this patent is extended or adjusted under 35 U.S.C. 154(b) by 520 days.

(21) Appl. No.: 15/928,372

(22) Filed: Mar. 22, 2018

(65) Prior Publication Data

US 2019/0291856 A1 Sep. 26, 2019

(51) Int. Cl.
| | |
|---|---|
| *B64C 27/08* | (2006.01) |
| *B64C 27/14* | (2006.01) |
| *B64C 27/32* | (2006.01) |
| *B64C 27/12* | (2006.01) |
| *B64C 27/473* | (2006.01) |
| *B64C 11/18* | (2006.01) |
| *G10K 11/178* | (2006.01) |

(52) U.S. Cl.
CPC ............. *B64C 27/08* (2013.01); *B64C 11/18* (2013.01); *B64C 27/12* (2013.01); *B64C 27/14* (2013.01); *B64C 27/32* (2013.01); *B64C 27/473* (2013.01); *B64C 2201/024* (2013.01); *B64C 2201/027* (2013.01); *B64C 2201/108* (2013.01); *B64C 2220/00* (2013.01); *G10K 11/178* (2013.01)

(58) Field of Classification Search
CPC ......... B64C 27/08; B64C 27/14; B64C 27/32; B64C 27/52; B64C 2220/00
See application file for complete search history.

(56) References Cited

U.S. PATENT DOCUMENTS

| | | | |
|---|---|---|---|
| 8,951,086 | B2 | 2/2015 | Woodworth et al. |
| 9,422,055 | B1 | 8/2016 | Beckman et al. |
| 9,745,050 | B2 | 8/2017 | Beckman et al. |
| 2017/0174317 | A1* | 6/2017 | Beckman ............... G01C 21/00 |
| 2017/0203839 | A1 | 7/2017 | Giannini et al. |

OTHER PUBLICATIONS

James ?: "Flying a quadcopter with 4 different props," www.propwashed.com, Dec. 14, 2016.
The extended European search report for Application No. 19164684.3, dated Jul. 29, 2019.
Intaratep, Nanyaporn, et al., Experimental Study of Quadcopter Acoustics and Performance at Static Thrust Conditions, Aeroacoustics Converences, May 30-Jun. 1, 2016, Lyon France.

* cited by examiner

*Primary Examiner* — Nicholas McFall
(74) *Attorney, Agent, or Firm* — Michael Stanley Tomsa; McAndrews, Held & Malloy, Ltd.; Eugene H. Nahm

(57) ABSTRACT

Disclosed is an aerial vehicle having a reduced noise signature. The aerial vehicle may be a vertical take-off and landing (VTOL) aerial vehicle. The aerial vehicle comprises an airframe and a plurality of rotors operatively coupled with one or more motors. The plurality of rotors may comprise a first, second, third, and fourth rotor. Each of the first, second, third, and fourth rotors may be arranged in a single plane and oriented to direct thrust downward relative to the airframe. In certain aspects, at least two of the plurality of rotors employ a different geometry to generate a targeted noise signature.

20 Claims, 12 Drawing Sheets

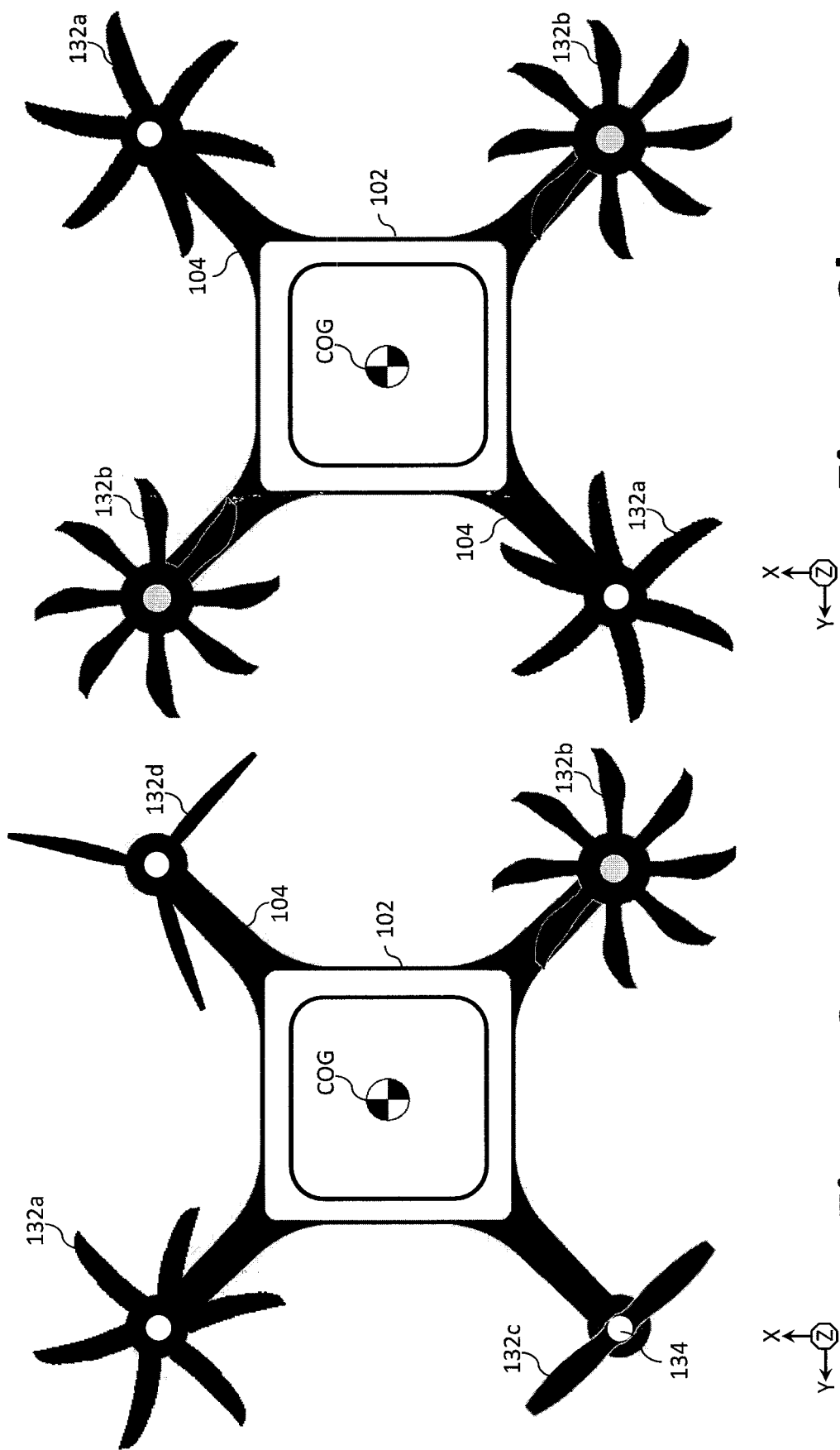

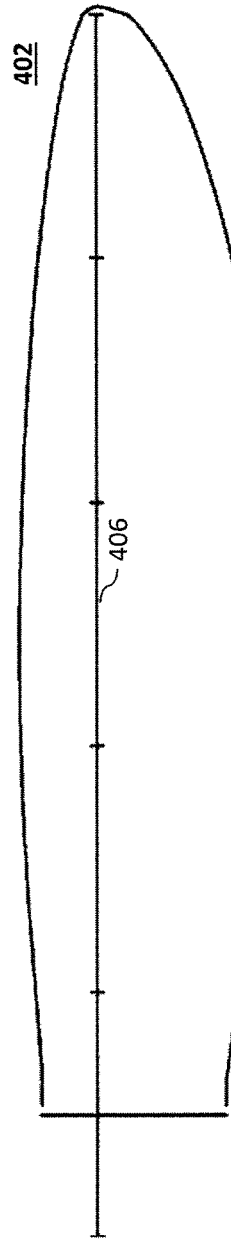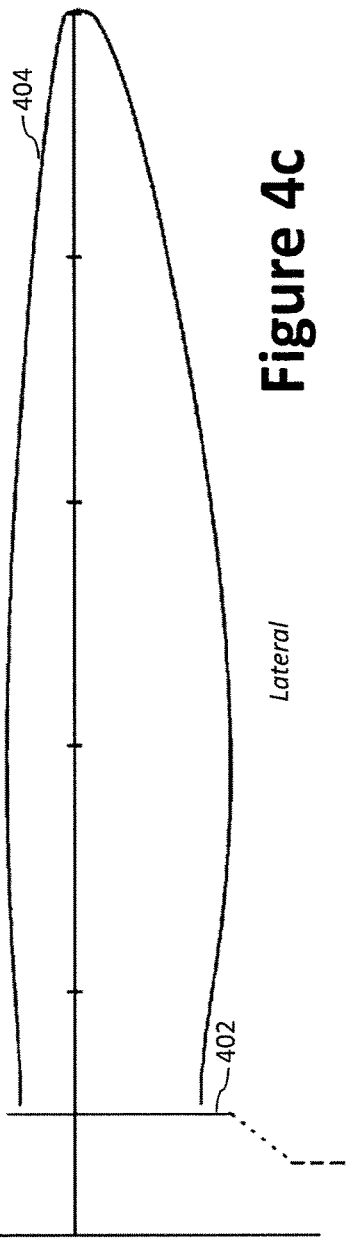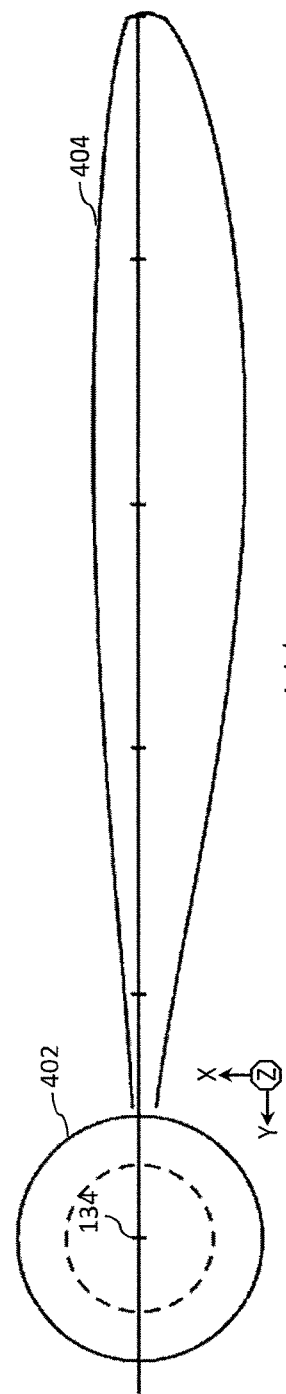

SYSTEMS AND METHODS FOR REDUCING THE PROPELLER NOISE

FIELD

The present invention relates to a system and method for controlling acoustic radiation in an aircraft, more specifically, for reducing the propeller noise in a rotorcraft.

BACKGROUND

All-electric and hybrid-electric aerial vehicles, typically driven by multiple rotors/propellers have become increasingly popular over the past decade. Such aerial vehicles, however, are prone to generate noise; a primary source of which are the rotors themselves.

There are many existing strategies for reducing the propeller noise, a majority of which address the rotor blade design itself. The noise coming off of a rotor can roughly be broken down into two main types of noise—Broadband and Periodic noise. Broadband noise includes vortex noise and turbulence-induced noise, while Periodic noise includes rotational noise and interaction/distortion effects. The tonal noise is heavily determined as a function of the propeller blade count and the revolutions per minute (RPM) at which the propeller blade is spinning (for a given operating point). Having multiple rotors operating at the same operating point has numerous negative effects on the perception of noise—one being constructive interference of the noise signatures that creates higher sound pressure level (SPL) peaks in the tonal noise components.

In view of the foregoing, a need exists for a system and method to mitigate the acoustic radiation emitted by an aerial vehicle.

SUMMARY

The present disclosure is directed to a system and method for controlling the acoustic radiation emitted by an aerial vehicle; more specifically, a passive system and method to mitigate the acoustic radiation emitted by a rotor craft.

According to a first aspect, an aerial vehicle having a reduced noise signature comprises: an airframe; a first electric motor configured to drive a first propeller, wherein the first propeller is oriented to provide lift to the airframe; and a second electric motor configured to drive a second propeller, wherein the second propeller is oriented to provide lift to the airframe, wherein the first propeller employs a first propeller design and the second propeller employs a second propeller design that is different from the first propeller design, and wherein the first propeller and the second propeller are configured to deliver an equivalent amount of thrust when driven at a predetermined revolutions per minute (RPM).

In certain aspects, the first propeller design and the second propeller design employ a different propeller blade count.

In certain aspects, the aerial vehicle is configured to dynamically adjust the predetermined RPM to achieve a desired noise signature of the aerial vehicle.

In certain aspects, the first propeller design consists of an even number of blades and the second propeller design consists of an odd number of blades.

In certain aspects, the first propeller and the second propeller are configured to be driven at the same RPM during hover flight mode.

In certain aspects, the first propeller and the second propeller are configured to be driven at a different RPM during hover flight mode.

In certain aspects, the first propeller and the second propeller are arranged in in a single plane.

In certain aspects, the first propeller and the second propeller each have a fixed axis of rotation.

In certain aspects, the first propeller and the second propeller each have a pivotal axis of rotation.

According to a second aspect, an aerial vehicle having a reduced noise signature, comprises: an airframe; and a plurality of propellers operatively coupled with one or more motors, the plurality of propellers comprising a first, second, third, and fourth propeller, wherein each of the first, second, third, and fourth propellers are arranged in a single plane and oriented to direct thrust downward relative to the airframe, where at least two of the plurality of propellers employs a different geometry.

In certain aspects, each of the plurality of propellers has a fixed axis of rotation.

In certain aspects, the first propeller design and the second propeller design employ blades with different lengths.

In certain aspects, the first propeller design consists of two blades and the second propeller design consists of three blades.

In certain aspects, the first propeller design and the second propeller design employ blades with different shapes.

In certain aspects, the first propeller and the second propeller are configured to be driven at a matching RPM during hover flight mode.

In certain aspects, the first propeller and the second propeller are configured to be driven at a different speed during hover flight mode.

According to a third aspect, a method for reducing a noise signature in an aerial vehicle comprises: driving a first electric motor, wherein the first electric motor is configured to drive a first propeller having a first propeller geometry at a predetermined revolutions per minute (RPM); driving a second electric motor, wherein the second electric motor is configured to drive a second propeller having a second propeller geometry at the predetermined RPM, wherein the second propeller geometry is different from the first propeller geometry and configured to deliver an equivalent amount of thrust as the first propeller geometry when driven at the predetermined RPM; dynamically monitoring, via a processor, the RPM of the first propeller and the second propeller to identify a deviation from the predetermined RPM; and adjusting the RPM of the first propeller or the second propeller in the event of a deviation from the predetermined RPM to adjust the noise signature.

In certain aspects, the processor dynamically monitors the RPM of the first propeller and the second propeller via an RPM sensor configured to provide RPM feedback to a proportional-integral-derivative (PID) controller, wherein the RPM feedback is used by the PID controller to adjust a power command to the first electric motor or the second electric motor.

In certain aspects, the method further comprises the step of implementing dynamically, via the processor, active noise control.

In certain aspects, the processor dynamically implements active noise control via microphone configured to provide noise feedback to a proportional-integral-derivative (PID) controller.

In certain aspects, the PID controller uses the noise feedback to adjust a power command to an active noise control transducer.

DESCRIPTION OF THE DRAWINGS

These and other advantages of the present invention will be readily understood with the reference to the following specifications and attached drawings wherein:

FIG. 1b illustrates a block diagram of an example aircraft control system for the VTOL UAV of FIG. 1a.

FIGS. 3a and 3b illustrate example VTOL quadcopter UAVs.

FIGS. 4a through 4d illustrate an example two-bladed propeller.

DETAILED DESCRIPTION

Figure 1A:
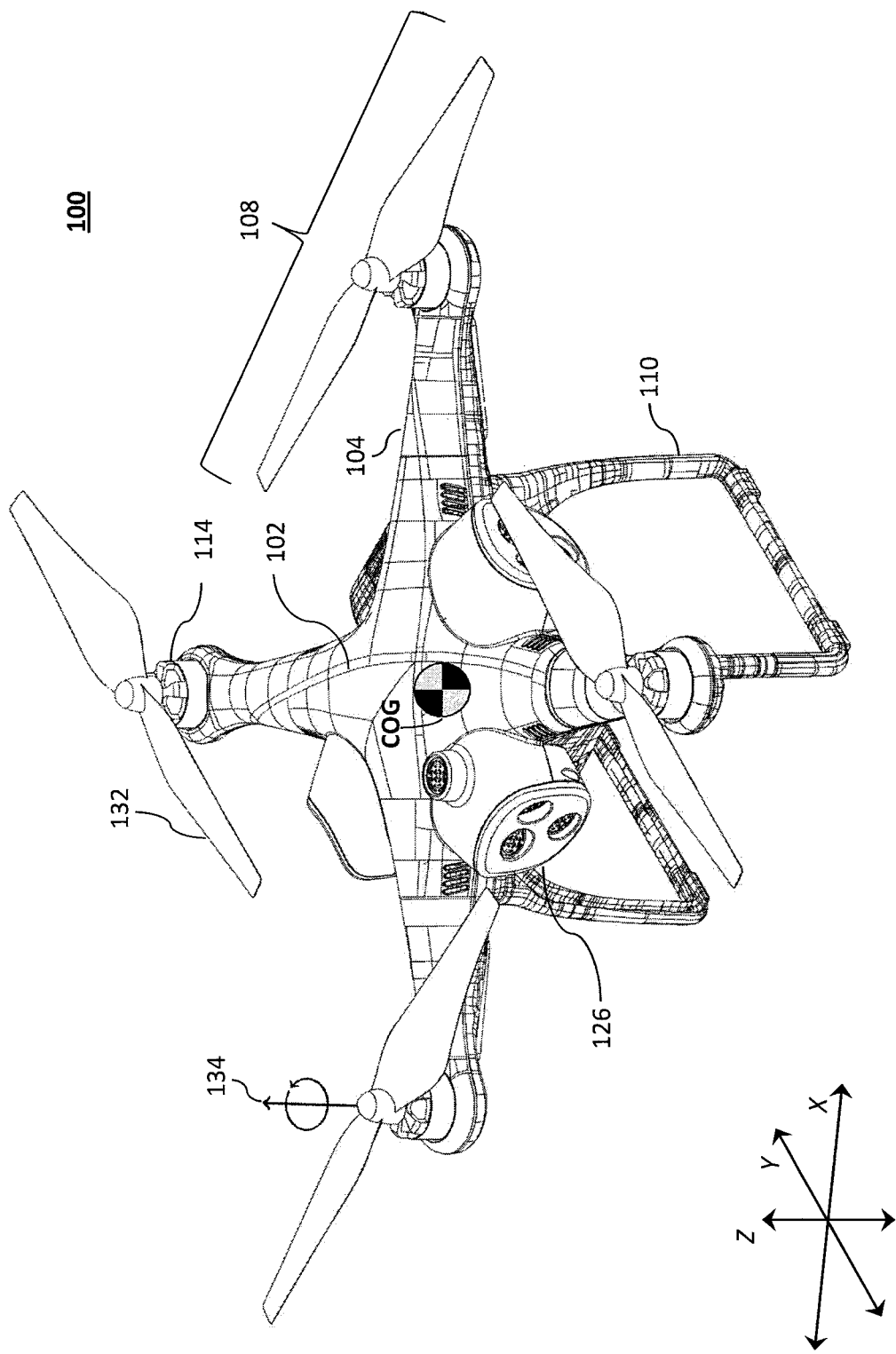
FIG. 1a illustrates an example multi-rotor vertical take-off and landing (VTOL) unmanned aerial vehicle (UAV).

Preferred embodiments of the present invention will be described hereinbelow with reference to the accompanying drawings. The components in the drawings are not necessarily drawn to scale, the emphasis instead being placed upon clearly illustrating the principles of the present embodiments. For instance, the size of an element may be exaggerated for clarity and convenience of description. Moreover, wherever possible, the same reference numbers are used throughout the drawings to refer to the same or like elements of an embodiment. In the following description, well-known functions or constructions are not described in detail because they may obscure the invention in unnecessary detail. No language in the specification should be construed as indicating any unclaimed element as essential to the practice of the embodiments. In the following description, it is understood that terms such as "first," "second," "top," "bottom," "side," "front," "back," and the like, are words of convenience and are not to be construed as limiting terms. For this application, the following terms and definitions shall apply:

The terms "about" and "approximately," when used to modify or describe a value (or range of values), mean reasonably close to that value or range of values. Thus, the embodiments described herein are not limited to only the recited values and ranges of values, but rather should include reasonably workable deviations. The terms horizontal and vertical, as used herein, are used to describe angles or planes relative to the ground, such as when the aircraft is on the ground.

The terms "aerial vehicle" and "aircraft" refer to a machine capable of flight, including, but not limited to, fixed-wing aircraft, unmanned aerial vehicle, variable wing aircraft, and vertical take-off and landing (VTOL) aircraft. VTOL aircraft may include fixed-wing aircraft (e.g., Harrier jets), rotorcraft (e.g., helicopters), tilt-rotor/tilt-wing aircraft, multi-rotor aircraft, etc.

As utilized herein, "and/or" means any one or more of the items in the list joined by "and/or." As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y, and/or z" means "one or more of x, y, and z."

The terms "communicate" and "communicating" refer to both transmitting, or otherwise conveying, data from a source to a destination and delivering data to a communications medium, system, channel, network, device, wire, cable, fiber, circuit, and/or link to be conveyed to a destination.

The terms "circuits" and "circuitry" refer to physical electronic components (i.e., hardware) and any software and/or firmware ("code") which may configure the hardware, be executed by the hardware, and or otherwise be associated with the hardware. As used herein, for example, a particular processor and memory may comprise a first "circuit" when executing a first set of one or more lines of code and may comprise a second "circuit" when executing a second set of one or more lines of code.

The terms "exemplary" and "example" mean serving as a non-limiting example, instance, or illustration. As utilized herein, the terms "e.g." and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by an operator-configurable setting, factory trim, etc.).

The term "processor" means processing devices, apparatuses, programs, circuits, components, systems, and subsystems, whether implemented in hardware, tangibly embodied software, or both, and whether or not it is programmable. The term "processor" as used herein includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing. The processor may be, for example, any type of general purpose microprocessor or microcontroller, a digital signal processing (DSP) processor, an application-specific integrated circuit (ASIC). The processor may be coupled to, or integrated with a memory device.

The term "memory device" means computer hardware or circuitry to store information for use by a processor. The memory device can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EE-PROM), a computer-readable medium, or the like.

A number of design factors can affect noise in an aerial vehicle's propulsion system; including: the rotor(s), motor selection/operating points, vehicle (airframe) structure, and any active noise cancelling systems. Multi-rotor VTOL UAVs (aka, rotorcraft), such as quadcopters, are becoming extremely prevalent in today's society and one of their strongest detractors is noise; especially the noise generated from the rotors. A rotor noise signature is tied to a number of design factors; including propeller blade count, RPM, propeller diameter, and shape (e.g., propeller blade/airfoil shape). Not only does each rotor individually radiate noise, but the interaction amongst the rotor and interaction between the rotors and the vehicle also generates noise when multiple rotors are positioned on the vehicle. In terms of tonal noise, the largest component is driven by the blade passage frequency (BPF), which is tied to blade count and RPM. A vehicle with multiple rotors complicates this soundscape through both simple superposition of noise as well as interaction effects. For example, when multiple rotors operating at the same operating point, their noise signatures can interact constructively to increase sound pressure level (SPL) of the tonal noise. To reduce the noise signature, the subject disclosure introduces the concept of, inter alia, providing different rotor geometries on the same vehicle by varying the shape, number of blades, and their operating conditions; thereby spreading the noise across the spectrum (rather than having large amplitude discrete tones, for example). Even more specifically, the present disclosure describes using multiple rotor designs on a single vehicle to spread the energy across more of the spectrum because the noise character of each rotor will be different—particularly the tonal noise resulting in lower peak SPL and reduced perceived annoyance.

FIG. 1a illustrates an example multi-rotor aerial vehicle 100, specifically, a VTOL quadcopter UAV. The aerial vehicle 100 generally comprises an airframe 102 (e.g., a fuselage or other structure), a plurality of rotor booms 104 (e.g., four longitudinal booms) extending radially from the airframe 102, landing gear 110 (e.g., skids or wheeled landing gear), and a plurality of propulsors 108 (e.g., one per rotor boom 104).

The airframe 102 may be coupled with a proximal end of each of the plurality of rotor booms 104 such that the distal ends of the plurality of rotor booms 104 extend radially from the airframe 102. The airframe 102 and the plurality of rotor booms 104 may be fabricated as a singular unit (as illustrated), or as separate components to be coupled to one another. The distal end of each of the plurality of rotor booms 104 may be coupled with a propulsor 108, each of which is illustrated as a lift motor 114 coupled to, and configured to drive/rotate, a propeller 132. Each of said plurality of propulsors 108 is placed at a distal end of a rotor boom 104 and oriented to direct thrust downward (relative to the airframe 102) along the Z-axis. The axis of rotation 134 of each of the plurality of propulsors 108 may be fixed and substantially parallel to the Z-axis to direct thrust downward from the propeller 132.

As illustrated, each of the propellers 132 generally reside/rotate in the same plane (the X-Y plane, as illustrated) and have axes of rotation 134 that are parallel to one another (and the Z-axis). As illustrated, when viewed from the top, the plurality of rotor booms 104 are substantially the same length and the aerial vehicle 100 is substantially symmetrical along the X and Y axes. Accordingly, in such an arrangement, the distance between each propulsor 108 and the aerial vehicle's 100 center of gravity (COG) is substantially the same.

The center of gravity of the aerial vehicle 100 may be determined using known techniques (e.g., using computer-aided design (CAD) software or using known mathematical equations). As can be appreciated by those of ordinary skill in the art, the term center of gravity generally refers to a point at which, if the aerial vehicle 100 were suspended, it would be balanced in all positions—i.e., aerial vehicle's 100 hypothetical balancing point in all directions. In the illustrated example, the COG for the aerial vehicle 100 in the X-Y plane coincides with the COG of the airframe 102 in the X-Y plane, but may different in the Z-axis.

The lift motor 114 may be an electric motor controlled via an electronic speed controller (ESC) 106. To that end, an ESC 106 may also be provided, for example, adjacent the lift motor 114 and integrated (or otherwise coupled) at the distal end of a rotor boom 104. While the aerial vehicle 100 is illustrated as having four propulsors 108, a person of skill in the art would understand that additional, or fewer, propulsors 108 may be employed to achieve a desired function and depending on, for example, thrust requirements. Therefore, the aerial vehicle 100 may employ virtually any number of propulsors 108. For example, the aerial vehicle 100 may employ three or more propulsors 108, such as tricopter (3-rotor aerial vehicle), quadcopter (4-rotor aerial vehicle), hexacopter (6-rotor aerial vehicle), and octocopter (8-rotor aerial vehicle) aerial vehicles.

In addition to conventional configurations with all rotors radiating from a central hub, there are other multicopter configurations that could benefit from the present disclosure, such as an eVTOL (Electric Vertical Take-off and Landing) aircraft configuration with two rows of rotors on either side of a central body. In other aspects, the aircraft may employ a distributed electric propulsion system with propulsors positioned along the wing, which, as will be discussed with reference to FIGS. 10a and 10b, may employ tilt-wing functionality.

While the lift motors 114 are illustrated at the distal end of each rotor boom 104, the lift motors 114 (or a single lift motor 114) may instead be positioned at the airframe 102 and configured to drive (rotate) one or more propellers 132 via a gearbox and/or a driveshaft between the lift motor 114 and the one or more propellers 132. Further, while each rotor boom 104 is illustrated as having only a single propulsor 108, multiple propulsors 108 may be provided at the distal end of each rotor boom 104. For example, a cross-member (not shown) may be positioned at the distal end of each rotor boom 104 and arranged to space the propulsors 108 from one another (e.g., perpendicularly to the length of the rotor boom 104) or to otherwise prevent interference between propellers 132 (e.g., a staggered/overlapping configuration). The components of the aerial vehicle 100 may be fabricated from metal, a composite material, or a combination thereof. While FIG. 1a illustrates a multi-rotor VTOL configured as a quadcopter, the subject disclosure may be applied to other forms of aircraft, including fixed-wing, such as those having a distributed electric propulsion vehicle.

Figure 1B:
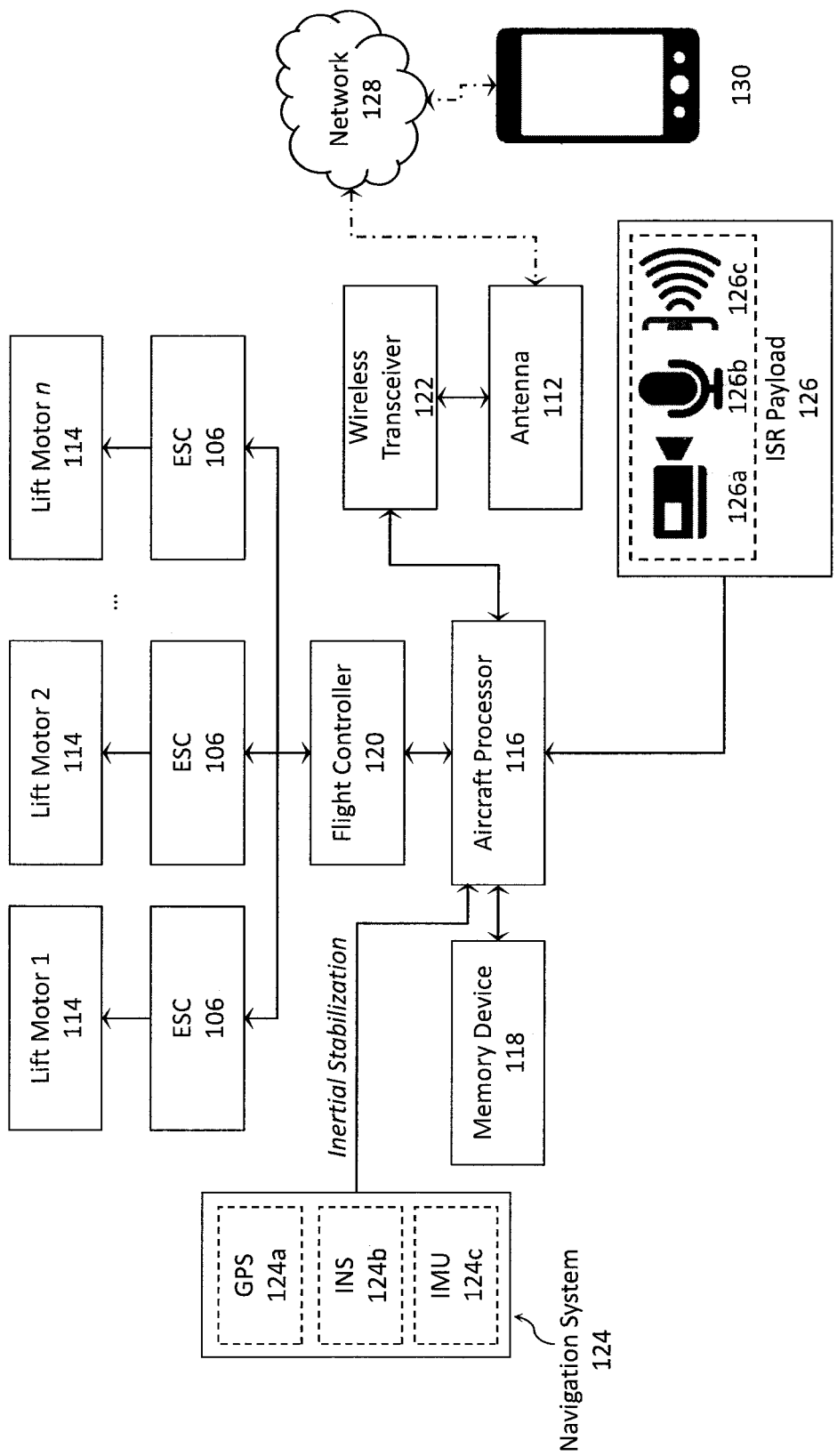

FIG. 1b illustrates a block diagram of an example aircraft control system for the aerial vehicle 100. The aircraft control system is configured to control the various aircraft components and functions of the aerial vehicle 100. As illustrated, the aerial vehicle 100 includes one or more aircraft processors 116 communicatively coupled with at least one memory device 118, a flight controller 120, a wireless transceiver 122, and a navigation system 124. The aircraft processor 116 may be configured to perform one or more operations based at least in part on instructions (e.g., software) and one or more databases stored to the memory device 118 (e.g., hard drive, flash memory, or the like).

The aircraft control system may further include other desired services, such as a wireless transceiver 122 coupled with an antenna 112 to communicate data between the aerial vehicle 100 and a remote device 130 (e.g., remote controls or portable electronic devices, such as smartphones, tablets, and laptop computers) or other controller (e.g., a base station). For example, the aerial vehicle 100 may communicate data (processed data, unprocessed data, etc.) with the remote device 130 over a network 128. In certain aspects, the wireless transceiver 122 may be configured to communicate using one or more wireless standards such as Bluetooth (e.g., short-wavelength, Ultra-High Frequency (UHF) radio waves in the Industrial, Scientific, and Medical (ISM) band from 2.4 to 2.485 GHz), near-field communication (NFC), Wi-Fi (e.g., Institute of Electrical and Electronics Engineers' (IEEE) 802.11 standards), etc. The remote device 130 may facilitate monitoring and/or control of the aerial vehicle 100 and its payload(s), including an intelligence, surveillance, and reconnaissance (ISR) payload 126.

The aircraft processor 116 may be operatively coupled to the flight controller 120 to control operation of the various actuators (e.g., those to control movement of any flight surfaces) and/or lift motor 114 (e.g., via ESC 106) in response to commands from an operator, autopilot, a navigation system 124, or other high-level system via the wireless transceiver 122. In certain aspects, the aircraft processor 116 and the flight controller 120 may be integrated into a single component or circuit. In operation, the flight controller 120 may dynamically (i.e., in real-time or near real-time) and independently adjust thrust from each of the propellers 132/lift motors 114 on each rotor boom 104 during the various stages of flight (e.g., take-off, cruising, landing) via the ESC 106 to control roll, pitch, or yaw of the aerial vehicle 100. In other words, the flight controller 120 can independently control each of the lift motors 114 on a given rotor boom 104 to generate a desired lift thrust for each of the lift motors 114 (or to achieve a desired noise level). For example, the flight controller 120 may vary the RPM of the propellers 132 and/or, where desired, vary the pitch of the propeller blades. Specifically, the lift motors 114 may be controlled by adjusting power supplied to each electric motor from a power supply (e.g., a battery pack or a battery bank) via the ESC 106.

The aircraft processor 116 may be operatively coupled to the navigation system 124, which may include a global positioning system (GPS) 124a that is communicatively coupled with an Inertial Navigation System (INS) 124b and/or an inertial measurement unit (IMU) 124c, which can include one or more gyros and accelerometers. The GPS 124a gives an absolute drift-free position value that can be used to reset the INS solution or can be blended with it by use of a mathematical algorithm, such as a Kalman Filter. The navigation system 124 may communicate, inter alia, inertial stabilization data to the aircraft processor 116.

To collect data and/or monitor an area, the aerial vehicle 100 may further be equipped with an ISR payload 126 comprising, for example, one or more cameras 126a (e.g., an optical instrument for recording or capturing images and/or video, including light detection and ranging (LIDAR) devices), audio devices 126b (e.g., microphones, echolocation sensors, etc.), and other sensors 126c to facilitated ISR functionality and provide ISR data (e.g. photographs, video, audio, sensor measurements, etc.). The ISR payload 126 is operatively coupled to the aircraft processor 116 to facilitate communication of the ISR data between the ISR payload 126 and the aircraft processor 116. The ISR data may be used as an input to the aircraft processor 116 to navigate the aerial vehicle 100. The ISR payload 126 may be rotatably and pivotally coupled to, for example, one or more side surfaces of the airframe 102 (or another structural component, such as the rotor booms 104) via a gimbal system to enable the ISR payload 126 to be more easily oriented downward to monitor objects below and/or on the ground. The data may be dynamically or periodically communicated from the aerial vehicle 100 to the remote device 130 over the network 128 via the wireless transceiver 122, or stored to the memory device 118 for later access or processing.

Figure 2:
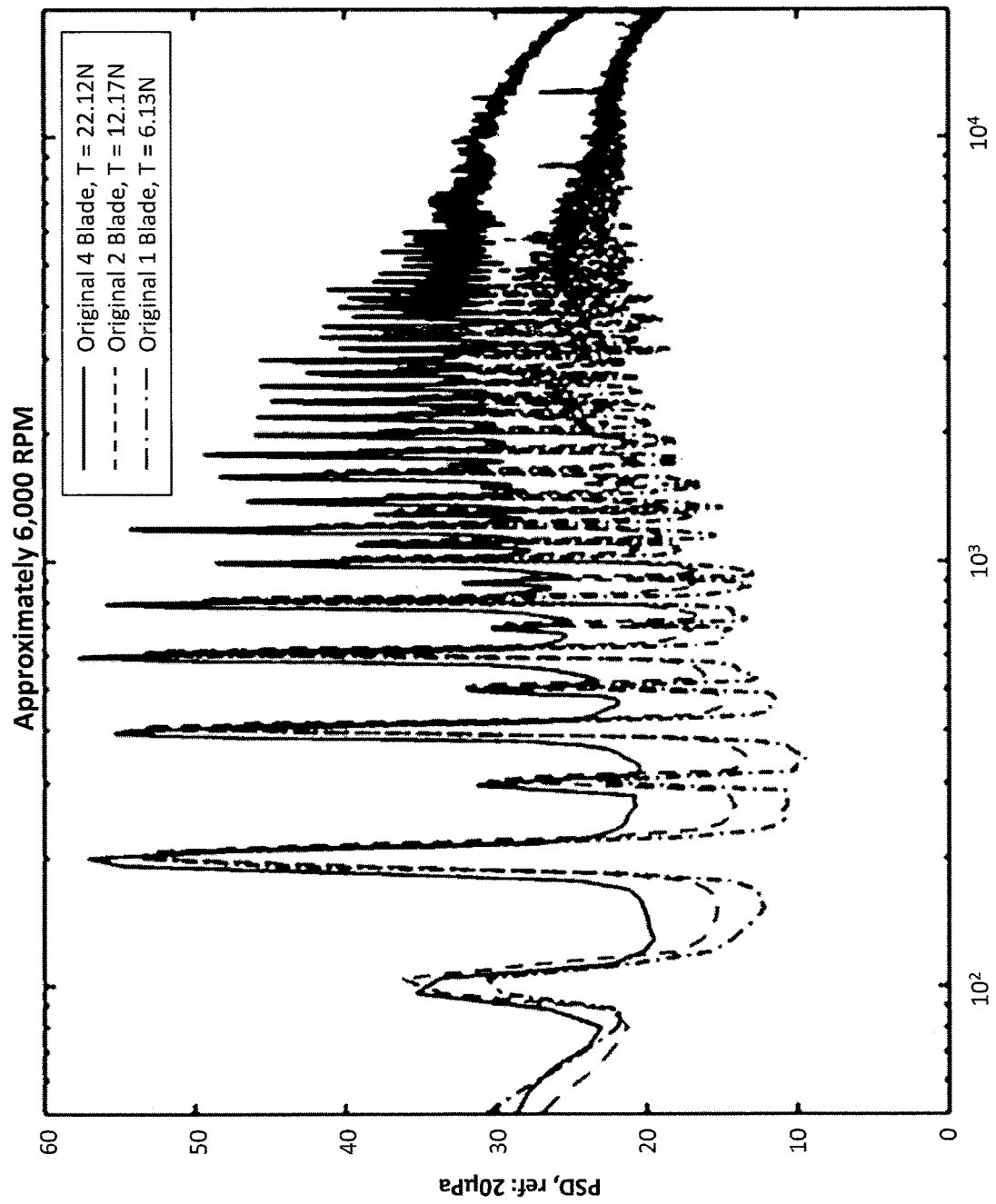
FIG. 2 illustrates the effect on the power spectral density when selectively driving the four identical propellers of a quadcopter VTOL UAV.
Figure 4A:
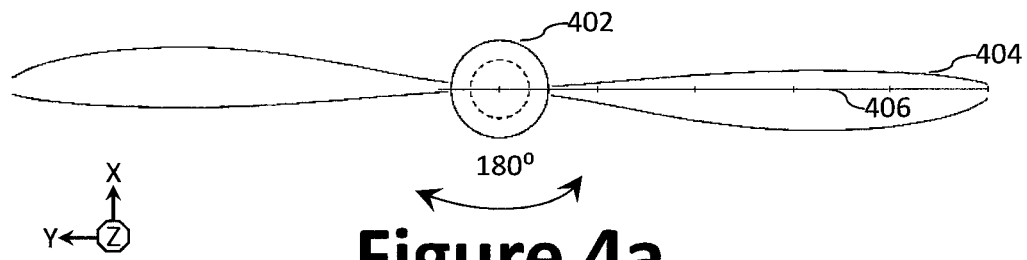
Figure 5A:
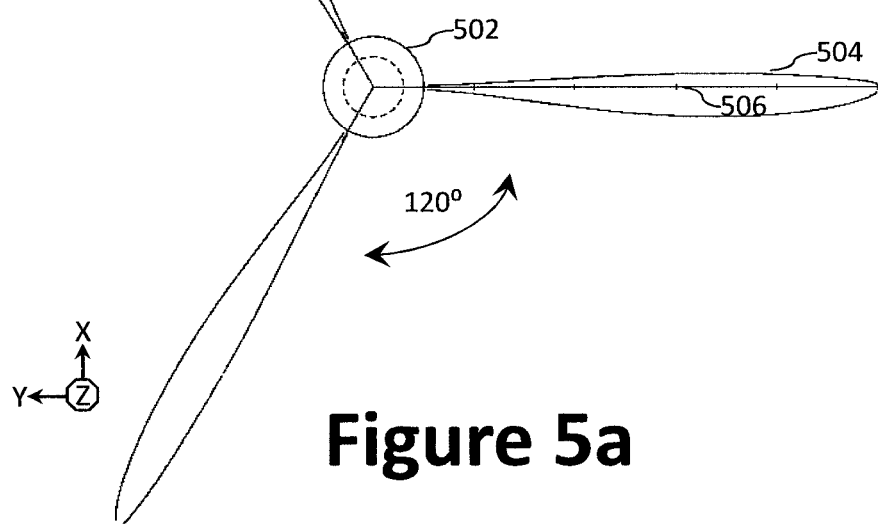
FIGS. 5a through 5d illustrate an example three-bladed propeller.

FIG. 2 is a chart illustrating the effect on the power spectral density when selectively driving the four identical propellers of the aerial vehicle 100 of FIG. 1 (e.g., a quadcopter VTOL UAV). Specifically, the solid line represents the effect on the power spectral density by driving/spinning all (i.e., four) identical propellers in unison, while the dot-dashed and dashed lines represent, respectively, the effect on the power spectral density when spinning only 1 and 2 of the propellers. The chart demonstrates that a constructive increase exists in the peaks corresponding to the BPF of the identical propellers when increasing from 1 to 2 to 4, which gets substantially more apparent at higher harmonics.

The constructive interference of the propeller noise signatures can be mitigated (or even avoided) by employing different propellers 132 operating at different design points (e.g., blade count, RPM, etc.). Indeed, propeller geometry variation may be used to achieve a reduced combined BPF and SPL. Accordingly, in one aspect of the present disclosure, the aerial vehicle 100 may employ propellers 132 of different propeller designs to reduce the overall noise signature of the vehicle. For example, the propellers 132 may be designed with different propeller blade counts that generate the same amount of thrust at the same RPM; thereby enabling operation at a constant RPM and simplifying the controls problem. Other aspects of the propeller design, however, could also be varied, such as the RPM, diameter (to reduce tip speed), or a combination thereof. Depending on the application, it may be impractical to vary the propeller diameter due to physical constraints. Additionally, the operating RPM may be dictated by the motor selection because motor efficiency peaks at a given RPM, therefore operating a motor off-peak would reduce the performance of the aircraft. Finally, variation of the RPM often requires the vehicle controller to account for such variation by providing motor control, which, although not considered to be a significant technical challenge, may be undesired. Having different propellers operating at different operating points operates to blur the spectra. Additionally, the BPF for each propeller design would be different and thus the peaks would occur out of phase with one another, resulting in lower peak SPL.

FIGS. 3a and 3b illustrate top plan views of example VTOL quadcopters 300a, 300b in accordance with one aspect. As illustrated, the propellers 132 that are used for propulsion and lift can be designed with differing blade counts, different RPM during hover flight mode, different diameters, or any combination thereof. The propellers can be mounted to the airframe 102 via the rotor booms 104 with all four propellers of different geometries as illustrated in FIG. 3a or with two pairs of different geometries as illustrated in FIG. 3b. As described above with regard to the aerial vehicle 100 of FIG. 1, the propellers 132 may generally reside/rotate in the same plane (the X-Y plane, as illustrated) and have fixed axes of rotation 134 that are parallel to one another (and the Z-axis). That is, the propellers 132 are oriented to direct thrust downward (relative to the airframe 102) along the Z-axis. As illustrated if FIG. 3a, a VTOL quadcopter 300a may employ a set of four propellers 132 having both even and odd propeller blade counts; though as illustrated in the VTOL quadcopter 300b of FIG. 3b it is contemplated that propellers 132 employ only even (or only odd) propeller blade counts.

In contrast to existing rotorcraft that traditionally employ a set of identical propellers, the illustrated VTOL quadcopter 300a, 300b use a set of set of different (non-identical) propellers. Further, while each comprises four propellers 132, the VTOL quadcopter 300a uses 4 different propeller designs and the VTOL quadcopter 300b uses 2 different propellers (2 sets of two) designs. More specifically, the first VTOL quadcopter 300a comprises a six-bladed propeller 132a, an eight-bladed propeller 132b, a two-bladed propeller 132c, and a three-bladed propeller 132d, while the second VTOL quadcopter 300b uses a set of two six-bladed propellers 132a and a set of two eight-bladed propellers 132b. As illustrated, when arranged as a symmetrical rotorcraft, the distance between each propulsor's 108 axis of rotation 134 (about the Z-axis) and the aerial vehicle's 100 center of gravity (COG) in the X-Y plane is substantially the same.

In certain aspects, the flight controller 120 may be modified (e.g., via a software update) to accommodate the different propeller designs. For example, the flight controller 120 may implement one or more software methods to trim the quadcopter, thereby creating a balanced lift profile despite the disparity of the propellers 132. This may be accomplished through a combination of table-lookups (which vary the commanded propeller RPM as a function of the airspeed, weight, and other flight conditions) and feedback control, which measures deviations from desired trim conditions and feeds those deviations back to RPM commands. Feedback can take into account the difference in thrust-per-unit RPM provided by each of the propellers 132. These methods serve to ensure consistent and robust trim across the flight envelope (e.g., whether steady state hover flight or straight-line flight). Special care may also be taken to ensure reliable unsteady and maneuvering performance, disturbance rejection, and translation from one trim condition (airspeed, climb rate, etc.) to another. In another aspect, feed-forward mixing terms can be applied to vehicle moment commands coming from the flight control laws. These mixing terms serve to approximately account for the disparity in RPM-dependent thrust-per-RPM. Feedback may then be used to compare the actual rates and accelerations achieved to the commanded values serve to ensure that the system is more robust and to address inaccuracies in the mixing values. Therefore, feed-forward and/or feedback may be employed to achieve a desired performance.

Figure 8A:
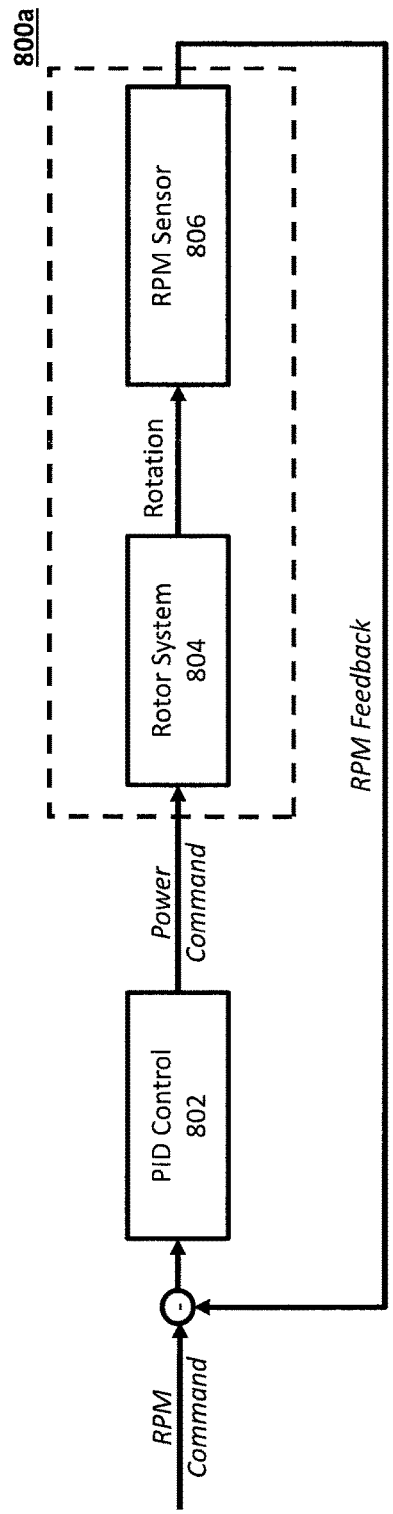
FIG. 8a illustrates a feedback control diagram to provide RPM feedback.
Figure 8B:
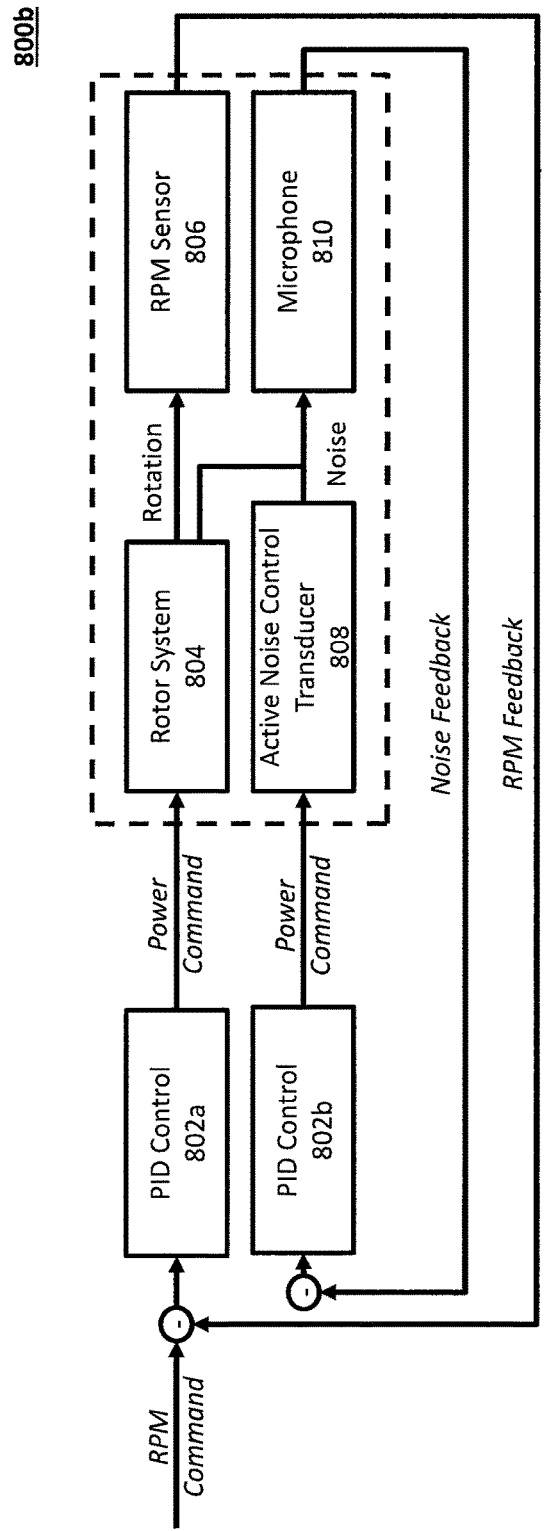
FIG. 8b illustrates a feedback control diagram to provide RPM feedback and to implement active noise control.

FIGS. 8a and 8b illustrate two example feedback control diagrams. Specifically, FIG. 8a illustrates a feedback control diagram 800a configured to provide RPM feedback for each rotor, while FIG. 8b illustrates a feedback control diagram 800b configured to also implement active noise control. The feedback control of FIGS. 8a and 8b may be implemented via aircraft processor 116 based on inputs from one of more sensors (e.g., of the ISR payload 126).

With reference to FIG. 8a, RPM commands may be input into a proportional-integral-derivative (PID) controller 802 (e.g., an RPM PID controller), which generates power commands. The power commands are communicated to the rotor system 804 (e.g., to the lift motor(s) 114 or another electric motor/actuator of the propulsion system) to drive (i.e., rotate) the propellers 132. An RPM sensor 806 may be operatively couple with the rotor system 804 to monitor the rotation of the propeller(s) 132 and/or lift motor(s) 114 to determine the RPM (e.g., dynamically—in real-time or near real-time). The measured (or calculated) RPM may be fed back to the PID controller 802 in the form of RPM feedback. The PID controller 802 may then adjust the power commands as a function of the RPM feedback.

Therefore, in certain aspects, the aerial vehicle 100 may employ a method for reducing the noise signature of the aerial vehicle. For example, the method may comprise driving a first electric motor (e.g., a first lift motor 114), wherein the first electric motor is configured to drive a first propeller 132 having a first propeller geometry at a predetermined RPM; and driving a second electric motor (e.g., a second lift motor 114), wherein the second electric motor is configured to drive a second propeller having a second propeller geometry at the predetermined RPM, wherein the second propeller geometry is different from the first propeller geometry and configured to deliver an equivalent amount of thrust as the first propeller geometry when driven at the predetermined RPM. The aerial vehicle 100 may, via the processor 116, dynamically monitor the RPM (e.g., actual or estimated) of the first propeller and the second propeller to identify a deviation from the predetermined RPM. In the event of a deviation from the predetermined RPM (i.e., the measured/estimated RPM deviates from a predetermined RPM range based on the predetermined RPM, such as an x % deviation), the processor 116 may adjust the RPM of the first propeller or the second propeller (as the case may be) to match the predetermined RPM, thereby adjusting the noise signature.

The feedback control diagram 800b of FIG. 8b is largely the same as the feedback control diagram 800a of FIG. 8a in terms of RPM feedback, except that the feedback control diagram 800b further implements active noise control. More specifically, while the feedback control diagram 800a employed a single PID controller 802 to facilitate RPM feedback (illustrated in FIG. 8b as PID controller 802a—RPM PID controller), the feedback control diagram 800b comprises a second PID controller 802b (e.g., a noise PID controller) to provide noise feedback. In operation, RPM commands may be inputted into the PID controller 802a, which generates power commands, which are communicated to the rotor system 804 to drive the propellers 132. A noise sensor (e.g., a microphone 810) may be positioned proximate the rotor system 804 (or components thereof) to monitor any noise generated by the propeller(s) 132 and/or lift motor(s) 114 and configured to generate noise feedback. The microphone 810 may be standalone or part of the ISR payload 126. The noise feedback may be communicated to the second PID controller 802b. The second PID controller 802b generates power commands to control an active noise control transducer 808, thereby adjusting the noise from the rotor system 804. The microphone 810 may continue to monitor the noise and provide noise feedback to the second PID controller 802b, which adjust the power commands to the active noise control transducer 808 as a function of the noise feedback. Therefore, in certain aspects, the aerial vehicle 100 may further implement dynamically, via the processor 116, active noise control. For example, the aircraft processor 116 may dynamically implement active noise control via the microphone 810, which is configured to provide noise feedback to the PID controller 802b. The noise feedback is used by the PID controller 802b to adjust a power command to the active noise control transducer 808.

To simplify the flight controller 120, the four different propellers (e.g., propellers 132a though 132d) may be configured (sized and shaped) to match thrust and power performance at a given RPM; despite employing a different propeller design (e.g., propeller blade count). For example, the propellers may be designed such that the lift motor 114 experiences the same thrust and torque for each propulsor 108; even with different numbers of blades on each propeller 132. Such an arrangement can allow more conventional flight controllers to work with different blade geometries and ensure the same motor can be used for each propeller.

FIGS. 4a through 4d illustrate an example two-bladed propeller 132c, while FIGS. 5a through 5d illustrate an example equivalent three-bladed propeller 132d. The two-bladed propeller 132c is deemed an equivalent to the three-bladed propeller 132d because it generates an equivalent (substantially the same) thrust and power when driven at the same RPM, despite employing a different propeller blade count and shape. As illustrated, the three-bladed propeller 132d of FIG. 5a has been modified from the two-bladed propeller 132c design shown in FIG. 4a by increasing the number of propeller blades from 2 propeller blades (a propeller blade count of 2) to 3 propeller blades (a propeller blade count of 3). Specifically, the two-bladed propeller 132c comprises two propeller blades 404 coupled to a center hub 402 and radially offset relative to one another by 180 degrees, while the three-bladed propeller 132d comprises three propeller blades 504 coupled to a center hub 502 and radially offset relative to one another by 120 degrees. While propeller blade counts of 2 and 3 are illustrated, other blade counts are contemplated, where the radial offset is generally determined by dividing 360 degrees by the blade count.

Figure 5B:
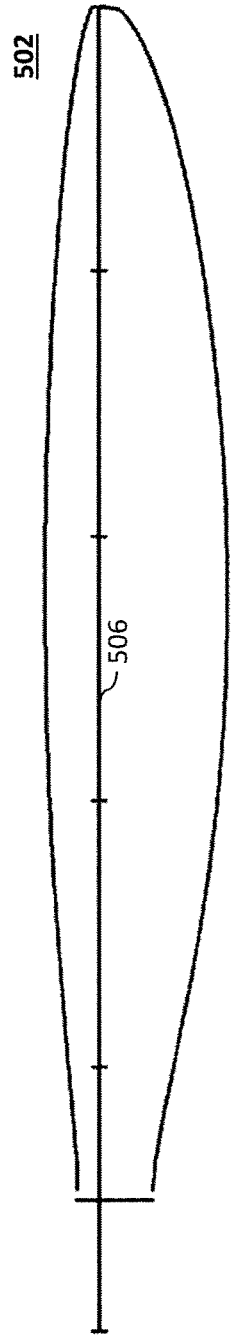
Figure 5C:
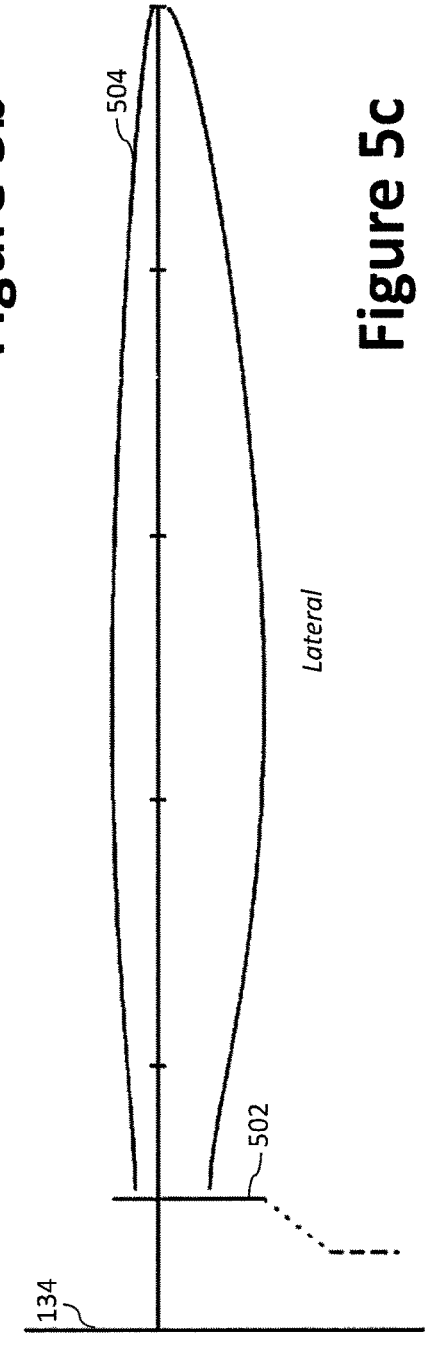
Figure 5D:
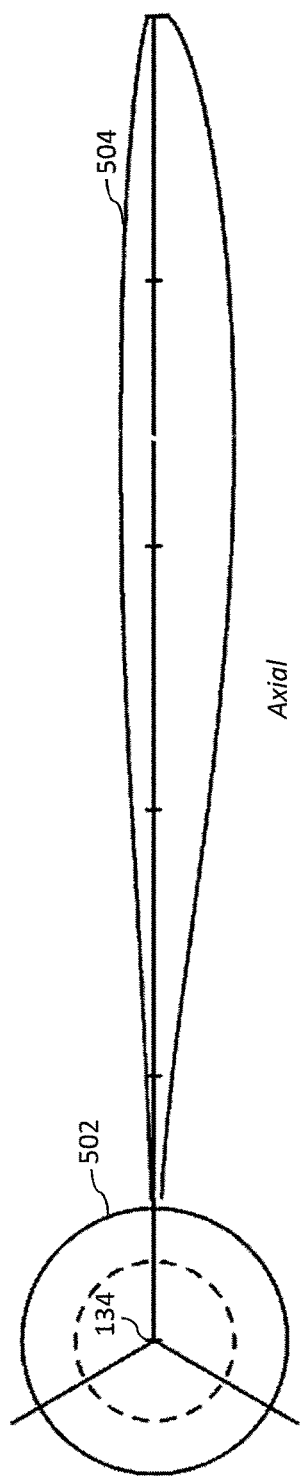

As best illustrated in FIGS. 5b through 5d vis-à-vis FIGS. 4b through 4d, the three-bladed propeller 132d has been redesigned to match the thrust and power curves of the two-bladed propeller 132c, resulting in changes to the geometry of the three-bladed propeller 132d. For example, as best illustrated in FIG. 4b vis-à-vis FIG. 5b, the chord lengths along the span 506 of the three-bladed propeller 132d are reduced compared to the chord lengths along the span 406 of the two-bladed propeller 132c. As is known in the art, a chord line refers the line that connects the leading edge and the trailing edge of the propeller blade's airfoil. The length of the chord line (i.e., chord length) changes as a function of the blade radius/length. That is, the chord length changes depending on its position along the blade length of the propeller blade. For example, the chord length of the chord line is shortest near the blade tip.

Figure 7A:
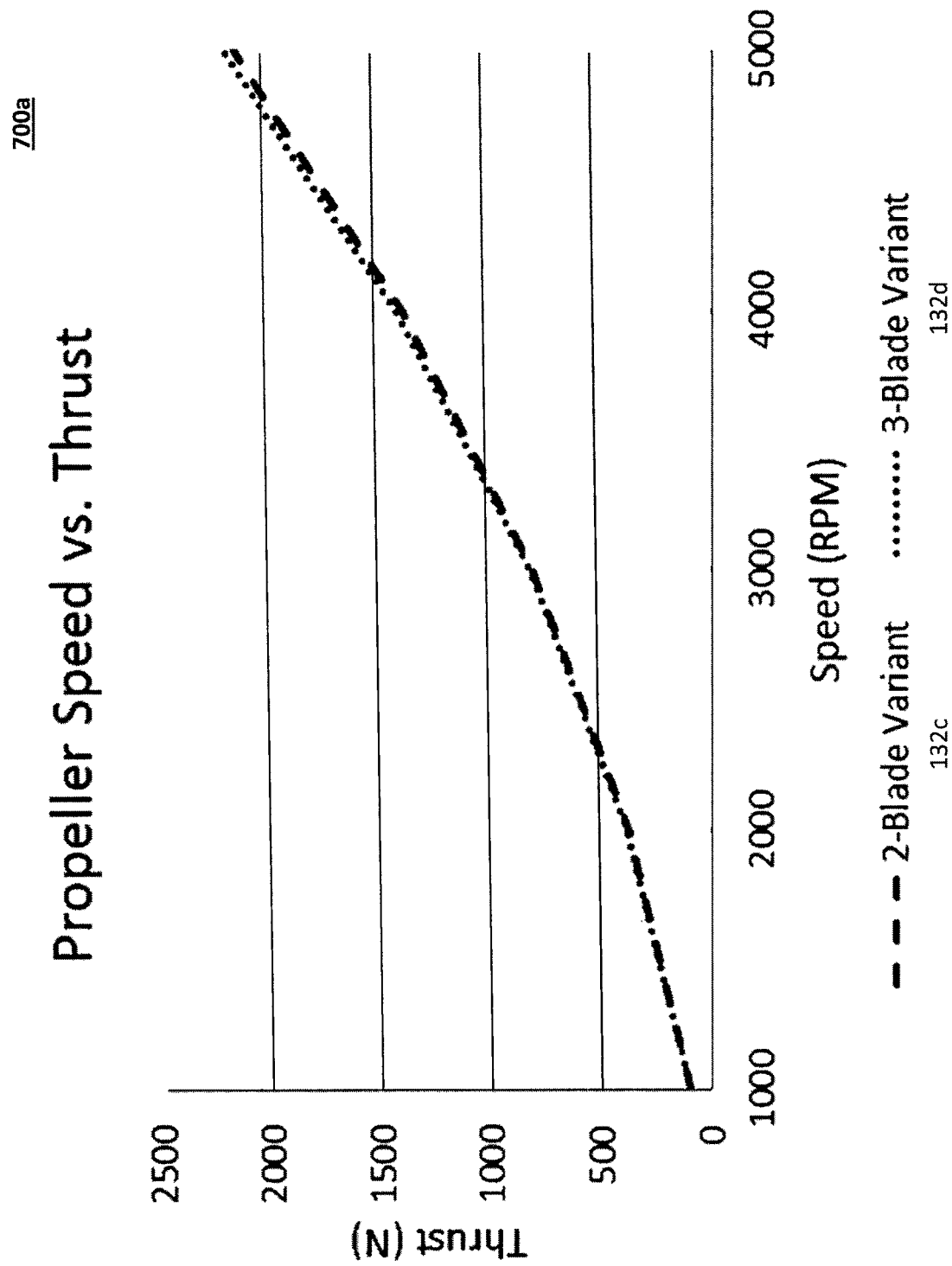
FIG. 7a illustrates a chart of the performance equivalence of the two-bladed propeller and the three-bladed propeller in terms of thrust.
Figure 7B:
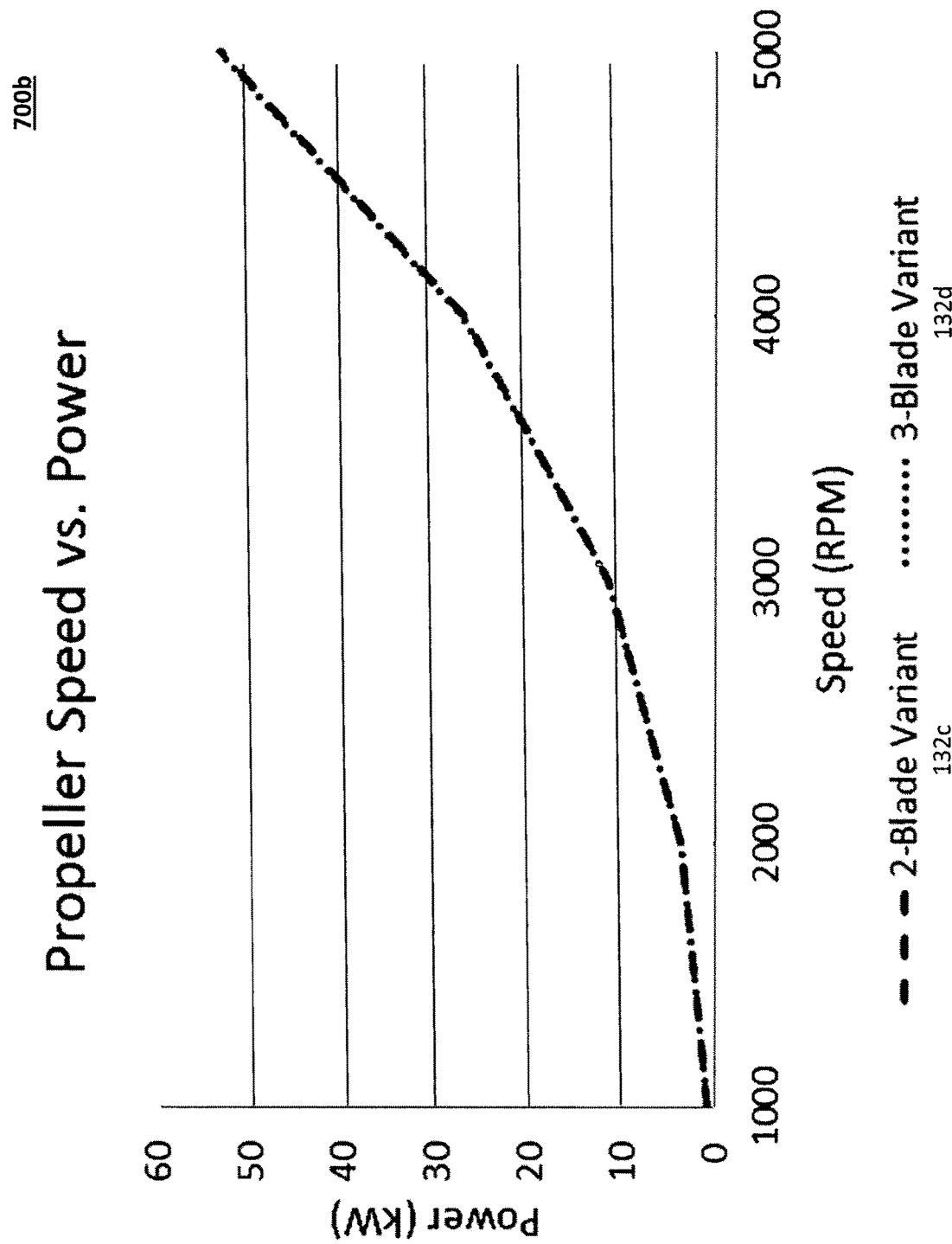
FIG. 7b illustrates a chart of the performance equivalence of the two-bladed propeller and the three-bladed propeller in terms of power.

To verify the performance equivalence of the two-bladed propeller 132c and the three-bladed propeller 132d, the thrust and power was determined as function of the speed (RPM); the results of which are illustrated in the charts 700a, 700b of FIGS. 7a and 7b. Specifically, the overlapping graph traces demonstrate that the propeller performance is substantially the same at a given speed (i.e., the same RPM); despite the number of blades/propeller blade count. Designing equivalent (matching) propellers with different blade counts reduces the complexity of the flight controller.

While the above examples describe to quadcopters having four propellers 132, the subject disclosure should not be viewed as limited to aircraft having an even number of each design of propeller. Therefore, depending on the vehicle configuration, a designer could replace one propeller having a first design with a propeller having a second, different (but equivalent) design where the propellers are operated at the same speed. Alternatively, the propellers on the vehicle could operate at different operating points. Further, the subject disclosure is not limited to VTOL aircraft and, therefore, may be applied to non-VTOL aircraft, for instance distributed electric propulsion fixed-wing aircraft. An example electric/hybrid electric propulsion fixed-wing aircraft is described in greater detail by commonly owned U.S. patent application Ser. No. 15/403,818 to Francesco Giannini et al., filed on Jan. 11, 2017 and titled "Hybrid Propulsion Vertical Take-Off and Landing Aircraft." In addition to reducing noise, the techniques of the subject disclosure would also work to mask vehicle's noise signature, thereby mitigating detection by opponent systems.

Figure 6:
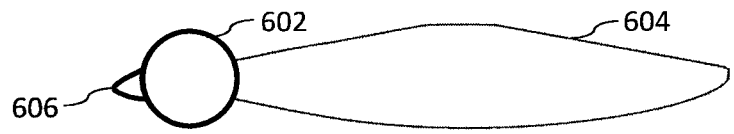
FIG. 6 illustrates an example single-bladed propeller.

While the subject disclosure has been primarily described as applied to entire propellers, this concept could be applied to a single propeller in terms of the individual blades. For example, the diameter, shape, and/or spacing of individual blades may be varied to adjust the signature. In certain aspects, employing blades with different diameters may be advantageous because their tip vortices will not interfere with one another, which can change the vehicle signature. Moreover, changing the spacing could serve to change the peaks on the spectra corresponding to the blade passage as it would no longer be a constant multiple of the number of blades. Further, it can be advantageous to add weight to one or more of the blades to reduce the differences in inertia caused by the propeller variations. These inertial variations could cause trim, yaw commands, and other moments commands to be poorly followed; however adding inertia may be employed as a mitigating strategy. One example of this is a single-bladed propeller. An example single blade propeller 132e is illustrated in FIG. 6, whereby the weight of the single blade 604 is countered on the opposite side of the center hub 602 using a weight 606 to balance the single blade propeller 132e, which can be aerodynamically efficient.

Finally, the blade-to-blade variations in inertia, operating point, and thrust-per-RPM across the set of blades may provide additional degrees of freedom that can be used to optimize flight characteristics. For example, by measuring acoustic signature (using a microphone or other means), an operator could tune the variation in RPM or loading, either in real-time or as an off-line calibration process, to further reduce the noise signature. Performing this tuning across the entire flight envelope is possible. An example system and method for adjusting an acoustic signature is described in greater detail by commonly owned U.S. patent application Ser. No. 15/588,977 to Martin Kearney-Fischer et al., filed on May 8, 2017 and titled "Systems and Methods for Acoustic Radiation Control." In another example, experimental tuning may be performed for a variety of blade configurations to determine an optimum combination of blades and RPMs which achieve low noise, consistent trim, and good maneuvering performance.

Figures 9A, 9B:
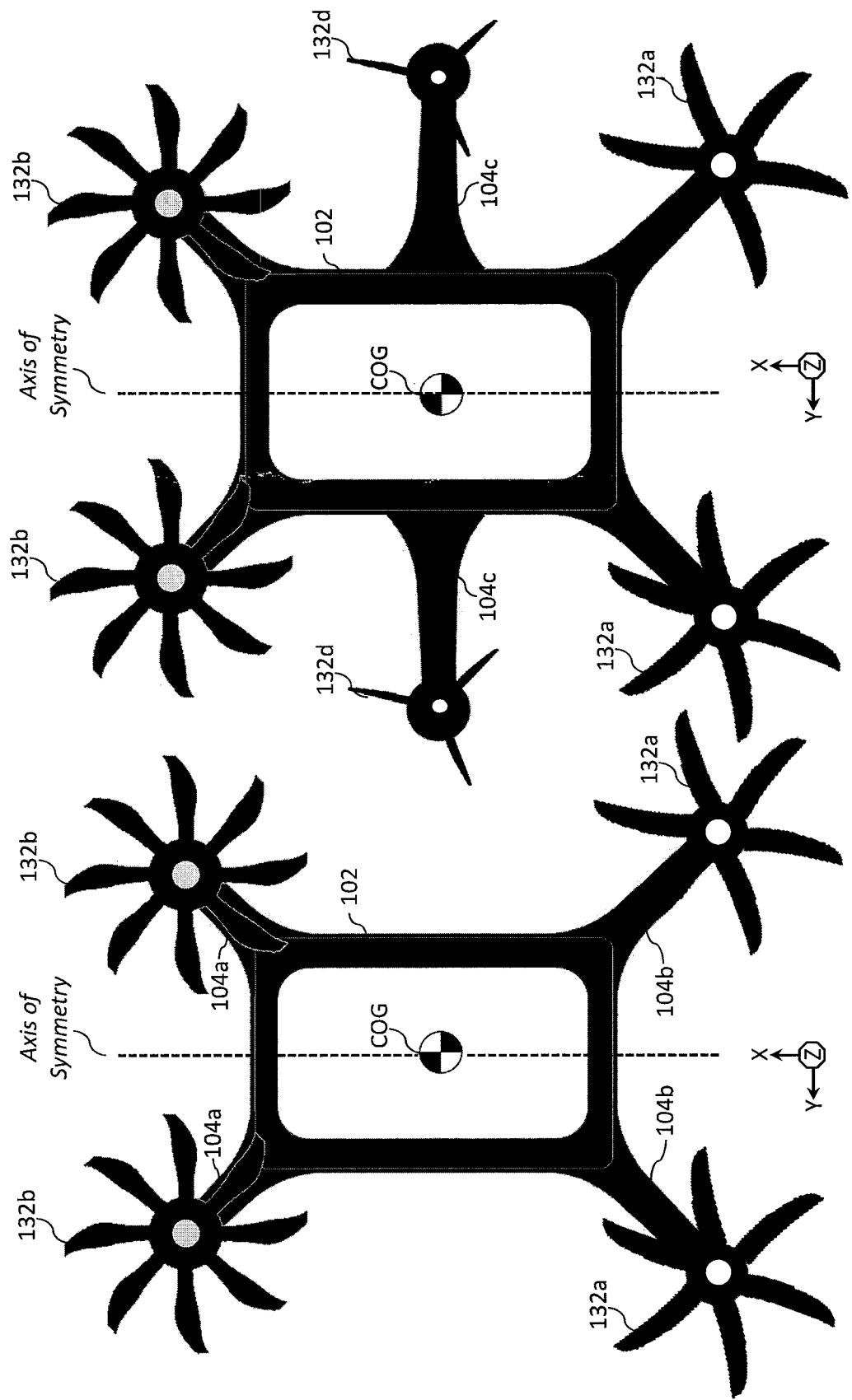
FIG. 9a illustrates a second example VTOL quadcopter UAV.
FIG. 9b illustrates an example VTOL hexacopter UAV.

With reference to FIGS. 9a and 9b, for example, the size and shape of the airframe 102 and the rotor booms 104 may be adjusted. Where applicable, the asymmetry of an aerial vehicle can be used as an advantage because the performance characteristics required in the longitudinal axis are different than those required laterally (i.e., the lateral axis). To that end, propeller blade designs, boom lengths, and RPMs may be optimized for performance, sensing field of regard, and other parameters along with the goal of creating a disparity in operating point to reduce noise. As illustrated in FIG. 9a, the aircraft may employ a set of six-bladed propellers 132a (forward set) and a set of eight-bladed propellers 132b (aft set), while the aircraft of FIG. 9b further comprises a set of three-bladed propellers 132d between the forward and aft sets to provide, inter alia, additional yaw control. Therefore, the aerial vehicle may be laterally symmetric to allow for simple flight control in the lateral axis, but equipped with different forward and aft propellers 132, RPMs, rotor boom 104 lengths, or the like in the longitudinal axis. Indeed, the propellers 132 may be optimized for a certain forward flight speed. In that way the high-speed performance, the maneuver performance, and the noise could all be co-optimized.

Asymmetry could be extended to rotor location as well as rotor type. For example, the rotor boom 104 lengths and heights-above ground (rotor plane) in the Z-axis could be varied to achieve a target acoustic effect, along with other parameter optimizations. Indeed, the aircraft of FIG. 9a employs two sets of 104, where the first set of rotor booms 104a is shorter than the second set of rotor booms 104b. FIG. 9b introduces a third set of rotor booms 104c to support the 132d (and any associated lift motors 114). Note, however, that both aircraft remain symmetrical across their axis of symmetry. In the rotor height dimension, elevation of the rotors above the booms would result in lower 'blade slap' (e.g., the pressure spike induced as each rotor blade passes over the boom, where the effect of the boom in the rotor wake can be varied by changing the height of the rotor above the boom. Destructive interference to reduce noise could be targeted in various ways, e.g. making the height of the rotor exactly K+½ the acoustic wavelength, where K is any integer. The various techniques disclosed herein may be applied to N propellers/rotors and, therefore, is not limited to four propellers/rotors normally associated with multi-rotor aerial vehicles.

While the foregoing has been primarily described in connection with multi-rotor VTOL aircraft having propellers with a fixed axis of rotation, the present disclosure may be applied to aircraft where one or more of the propellers have a pivotal axis of rotation to redirect the thrust vector from the propulsor 108.

Figure 10A:
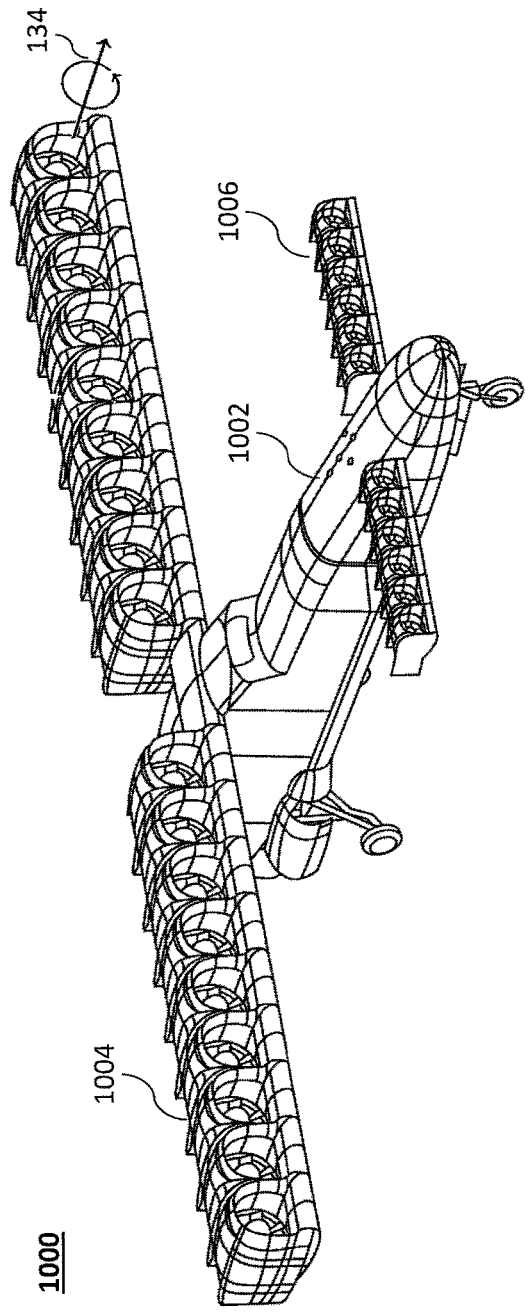
FIGS. 10a and 10b illustrate an example VTOL aircraft with tilt-wing functionality.
Figure 10B:
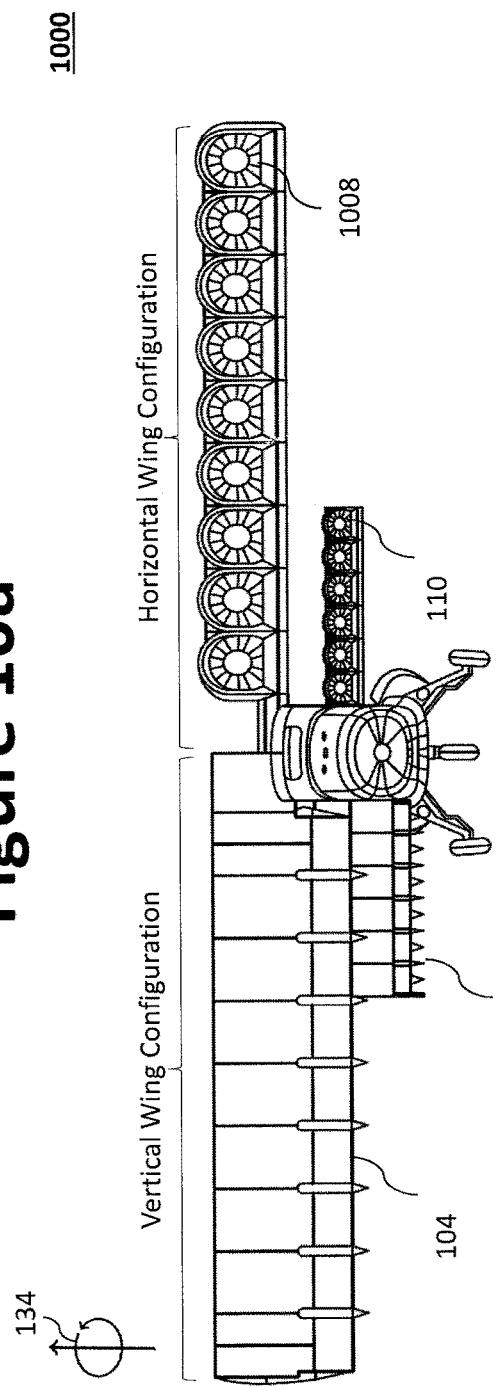

For example, FIGS. 10a and 10b illustrate an example VTOL aircraft 1000 with tilt-wing functionality. As illustrated a primary wing 1004 and a canard wing 1006 are positioned on each side of the fuselage 1002. A plurality of propulsors 108 are distributed along the length of each of the primary wing 1004 and the canard wing 1006. The two primary wings 1004, defining a primary wing set, and two canard wings 1006, defining a canard wing set, are pivotally mounted to the VTOL aircraft's 1000 airframe (e.g., at the topside of the fuselage 1002) to provide tilt-wing functionality. For instance, the fuselage 1002 may comprise a plurality of actuator-controlled pivotal connectors that selectively pivot the primary and canard wings 1004, 1006 (responsive to signals from a flight controller, such as flight controller 120) between a vertical wing configuration for VTOL operation and a horizontal wing configuration for forward/wing-born operation. As can be appreciated, each propeller's 132 axis of rotation 134 pivots with the primary/canard wings 1004, 1006 as the propulsor 108 is pivoted.

The VTOL aircraft 1000 may be a hybrid propulsion aircraft that generates propulsion using a plurality of independently controllable alternating current (AC) motor-driven ducted fans, which receive AC power from one or more turbine-driven generators. Therefore, the distributed electric propulsion system generally comprises an engine, a gearbox, one or more primary generators 1012, and a plurality of ducted fans, each of said plurality of ducted fans being driven by an electric motor. The plurality of ducted fans may include a plurality of primary ducted fans 1008 positioned on the primary wings 1004 and a plurality of canard ducted fans 1010 positioned on the canard wings 1006. The example VTOL aircraft 1000 is described in greater detail by commonly owned U.S. Patent Publication No. 2017/0203839 to Francesco Giannini et al., filed on Jan. 11, 2017 and titled "Hybrid Propulsion Vertical Take-Off and Landing Aircraft." In addition, commonly owned U.S. Pat. No. 8,951,086 to Adam Woodworth et al., issued on Feb. 10, 2015 and titled "Modular Miniature Unmanned Aircraft With Vectored-Thrust Control," discloses an aircraft with thrust-vectoring modules that are configured to provide lateral and longitudinal control to the aircraft by directly controlling a thrust vector for each of the pitch, the roll, and the yaw of the aircraft.

Although various embodiments have been described with reference to a particular arrangement of parts, features, and like, these are not intended to exhaust all possible arrangements or features, and indeed many other embodiments, modifications, and variations will be ascertainable to those of skill in the art. Thus, it is to be understood that the invention may therefore be practiced otherwise than as specifically described above. The above-cited patents and patent publications are hereby incorporated by reference in their entirety.

What is claimed is:

1. An aerial vehicle having a reduced noise signature, the aerial vehicle comprising:
   an airframe;
   a first electric motor configured to drive a first propeller, wherein the first propeller is oriented to provide lift to the airframe; and
   a second electric motor configured to drive a second propeller, wherein the second propeller is oriented to provide lift to the airframe,
   wherein the first propeller employs a first propeller design and the second propeller employs a second propeller design that is different from the first propeller design in terms of blade shape or propeller blade count, and
   wherein the first propeller and the second propeller are configured to deliver an equivalent amount of thrust when driven at a predetermined revolutions per minute (RPM).

2. The aerial vehicle of claim 1, wherein the first propeller design and the second propeller design employ a different propeller blade count.

3. The aerial vehicle of claim 1, wherein the aerial vehicle is configured to dynamically adjust the predetermined RPM to achieve a desired noise signature of the aerial vehicle.

4. The aerial vehicle of claim 2, wherein the first propeller design consists of an even number of blades and the second propeller design consists of an odd number of blades.

5. The aerial vehicle of claim 1, wherein the first propeller and the second propeller are configured to be driven at the same RPM during hover flight mode.

6. The aerial vehicle of claim 2, wherein the first propeller and the second propeller are configured to be driven at a different RPM during hover flight mode.

7. The aerial vehicle of claim 1, wherein the first propeller and the second propeller are arranged in in a single plane.

8. The aerial vehicle of claim 1, wherein the first propeller and the second propeller each have a fixed axis of rotation.

9. The aerial vehicle of claim 1, wherein the first propeller and the second propeller each have a pivotal axis of rotation.

10. An aerial vehicle having a reduced noise signature, the aerial vehicle comprising:
    an airframe; and
    a plurality of propellers operatively coupled with one or more motors, the plurality of propellers comprising a first, second, third, and fourth propeller, wherein each of the first, second, third, and fourth propellers are arranged in a single plane and oriented to direct thrust downward relative to the airframe, wherein at least two of the plurality of propellers employ a different geometry configured to deliver an equivalent amount of thrust when driven at a predetermined revolutions per minute (RPM).

11. The aerial vehicle of claim 10, wherein each of the plurality of propellers has a fixed axis of rotation.

12. The aerial vehicle of claim 10, wherein the at least two of the plurality of propellers employ blades with different lengths.

13. The aerial vehicle of claim 12, wherein a first one of the at least two of the plurality of propellers consists of two blades and a second one of the at least two of the plurality of propellers consists of three blades.

14. The aerial vehicle of claim 12, wherein the at least two of the plurality of propellers employ blades with different shapes.

15. The aerial vehicle of claim 10, wherein the first propeller and the second propeller are configured to be driven at a matching RPM during hover flight mode.

16. The aerial vehicle of claim 10, wherein the first propeller and the second propeller are configured to be driven at a different speed during hover flight mode.

17. A method for reducing a noise signature in an aerial vehicle, the method comprising:

driving a first electric motor, wherein the first electric motor is configured to drive a first propeller having a first propeller geometry at a predetermined revolutions per minute (RPM);

driving a second electric motor, wherein the second electric motor is configured to drive a second propeller having a second propeller geometry at the predetermined RPM, wherein the second propeller geometry is different from the first propeller geometry and configured to deliver an equivalent amount of thrust as the first propeller geometry when driven at the predetermined RPM;

dynamically monitoring, via a processor, an RPM of at least one of the first propeller and the second propeller to identify a deviation from the predetermined RPM; and adjusting the RPM of the first propeller or the second propeller in an event of a deviation from the predetermined RPM to adjust the noise signature.

18. The method of claim 17, wherein the processor dynamically monitors the RPM to provide RPM feedback to a proportional-integral-derivative (PID) controller, wherein the RPM feedback is used by the PID controller to adjust a power command to the first electric motor or the second electric motor.

19. The method of claim 17, wherein the processor dynamically implements active noise control via microphone configured to provide noise feedback to a proportional-integral-derivative (PID) controller.

20. The method of claim 19, wherein the PID controller uses the noise feedback to adjust a power command to an active noise control transducer.

* * * * *